D. W. ELDREDGE.
Watch Regulator.
No. 100,130. Patented Feb. 22, 1870.
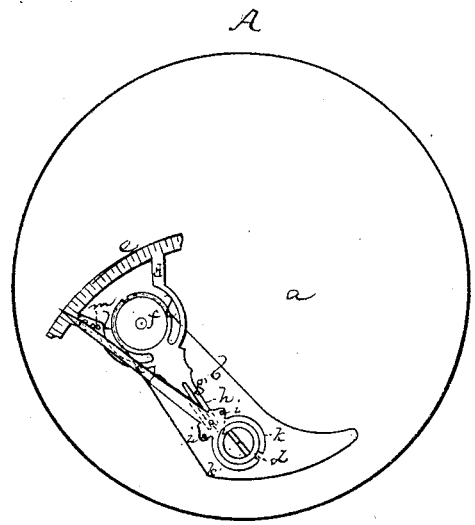
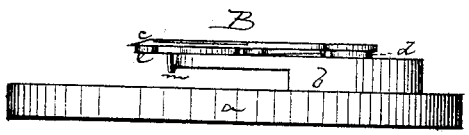
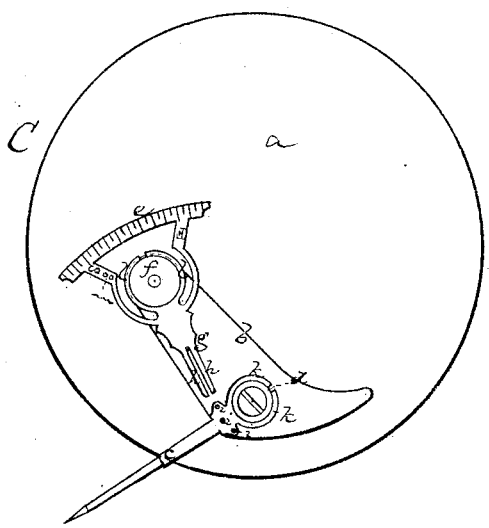
Witnesses
J. B. Kidder
M. W. Frothingham
D. A. Eldredge
by his attys.
Crosby, Halsted & Gould

United States Patent Office.

D. W. ELDREDGE, OF BOSTON, MASSACHUSETTS.

Letters Patent No. 100,130, dated February 22, 1870.

IMPROVEMENT IN WATCH-REGULATORS.

The Schedule referred to in these Letters Patent and making part of the same.

*To all whom it may concern:*

Be it known that I, D. W. ELDREDGE, of Boston, in the county of Suffolk, and State of Massachusetts, have invented an Improved Watch-Regulator; and I do hereby declare that the following, taken in connection with the drawings which accompany and form part of this specification, is a description of my invention sufficient to enable those skilled in the art to practice it.

My invention relates to that class of watch-regulators in which the length of the hair-spring is adjusted by a lever, the long arm of which generally works over a graduated index or scale.

In my improvement I provide for easy and accurate adjustment of the regulator, by combining the index-pointer with a movable index or scale placed upon or making one arm of a lever, whose other arm is pivoted to the index-pointer, the movement of the pointer in one direction effecting movement of the index-scale in the opposite direction; and My invention consists in the combination of a regulator-pointer with a pivoted scale over which the pointer is moved, such scale being jointed to and moved by the pointer-arm, and in the opposite direction to such arm.

The drawing represents a watch-regulator mechanism embodying my improvement.

A shows a plan of the mechanism, the index-pointer being over the scale.

B is an edge view of the mechanism.

C shows the pointer disconnected from the pivoted scale or scale-lever.

*a* denotes the watch-plate, having the regulator-bridge *b* fastened thereto.

*c* denotes the pointer-arm of the regulator fulcrumed and turning on a pin, *d*.

*e* denotes the index or scale over which the pointer is moved, and by which the extent of movement is indicated.

This index, instead of being a stationary scale, is hung on a stud or pin, *f*, projecting from the bridge *b*, the index being made as a lever turning on this pin, the scale forming one arm of the lever, and a long arm, *g*, extending over the bridge, as seen at A and C.

The upper end of this arm *g* is formed with two long springs, *h*, between which the pin *i* (extending from the inner surface of the pointer-arm *c*) enters the springs pressing upon the pin, so that by the slightest movement of the pointer-arm in either direction the arm *g* is moved with and by it, thereby causing movement of the scale-arc in the opposite direction under the index end of the pointer-arm, so that if the pointer be really moved but one degree of the scale, the scale will indicate a considerably greater movement; or if the scale be moved one degree by the pointer, (as indicated by the scale,) it will really be moved but little more than half a degree, thus enabling very slight and successive movements of the regulator, with ready means for comparison of the same, obtaining the same advantage that would be obtained by a continuation of an ordinary regulator to twice its length with a stationary scale.

It will be seen that all gearing is avoided by this construction; that the parts are but very few in number, (the main parts consisting only of the two levers,) and that they can be taken down and put up with the greatest ease, as by turning the pointer its pin slips out from between the springs *h*, as seen at C, and by slightly springing apart the two springs *k*, (which embrace the stub or pin *d*, and confine the pointer to the stud by friction,) the pointer may be removed; and the index-scale or lever is held upon its pivot by simply springing two spring-arms *l* around the stud *f*, (the springs embracing the stud *f* and holding by friction.)

The pointer-arm *c* may have three or a series of pins, *i*, either one of which may be connected with the arm *g*, when the regulator mechanism is attached to the watch in accordance with the position of the hair-spring. (The end of the hair-spring is connected to the regulator by passing its end between two pins, *m*, under the scale.)

I claim—

The combination of the pointer-lever or arm *c* with the movable index-scale or arc *e*, when the pointer-arm is connected to one arm of the index-lever, and by moving it moves the scale in the opposite direction, substantially as shown and described.

D. W. ELDREDGE.

Witnesses:
 FRANCIS GOULD,
 S. B. KIDDER.